US 6,725,385 B1

(12) United States Patent
Chu et al.

(10) Patent No.: US 6,725,385 B1
(45) Date of Patent: Apr. 20, 2004

(54) INTELLIGENT ELECTRONIC POWER CONTROLLER

(75) Inventors: Frank Rui-Feng Chu, Fremont, CA (US); Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 09/659,784

(22) Filed: Sep. 11, 2000

(51) Int. Cl.$^7$ ................................................ G06F 1/32
(52) U.S. Cl. ..................................... 713/320; 713/323
(58) Field of Search ............................. 713/300, 310, 713/320, 323, 324

(56) References Cited

U.S. PATENT DOCUMENTS

| 5,345,347 A | 9/1994 | Hopkins et al. |
| 5,402,200 A | 3/1995 | Shrinkle et al. |
| 5,412,809 A | 5/1995 | Tam et al. |
| 5,442,608 A | 8/1995 | Umeda et al. |
| 5,481,733 A | 1/1996 | Douglis et al. |
| 5,493,670 A | 2/1996 | Douglis et al. |
| 5,517,649 A | 5/1996 | McLean |
| 5,546,591 A | * 8/1996 | Wurzburg et al. ........... 713/322 |
| 5,682,273 A | 10/1997 | Hetzler |
| 5,892,958 A | * 4/1999 | Nagashige et al. ......... 713/323 |
| 5,903,773 A | * 5/1999 | Richardson et al. .......... 710/19 |
| 5,987,614 A | * 11/1999 | Mitchell et al. ............ 713/300 |
| 6,115,823 A | * 9/2000 | Velasco et al. ............. 713/322 |

* cited by examiner

Primary Examiner—Dennis M. Butler
(74) Attorney, Agent, or Firm—Mark C. McCabe, Esq.; Joseph P. Curtin, Esq.

(57) ABSTRACT

A device connected to an interface has operational logic and power control logic. The device further has multiple power modes, including a first mode and a second, lower power mode. In the first mode, the operational logic is coupled to the interface, and is able to communicate over the interface. In the second mode, the power control logic is coupled to the interface, and the operational logic is decoupled, and substantially powered down. This provides a low interface power mode. In this mode, the power control logic monitors the interface for command activity. The power control logic returns the device to the first mode when the device must be in the first mode to process or reply to the command. The power control logic thus provides for the restoration of function from a low interface power mode without the need for a special "wake-up" command, thereby making the low interface power mode transparent to the host.

42 Claims, 3 Drawing Sheets

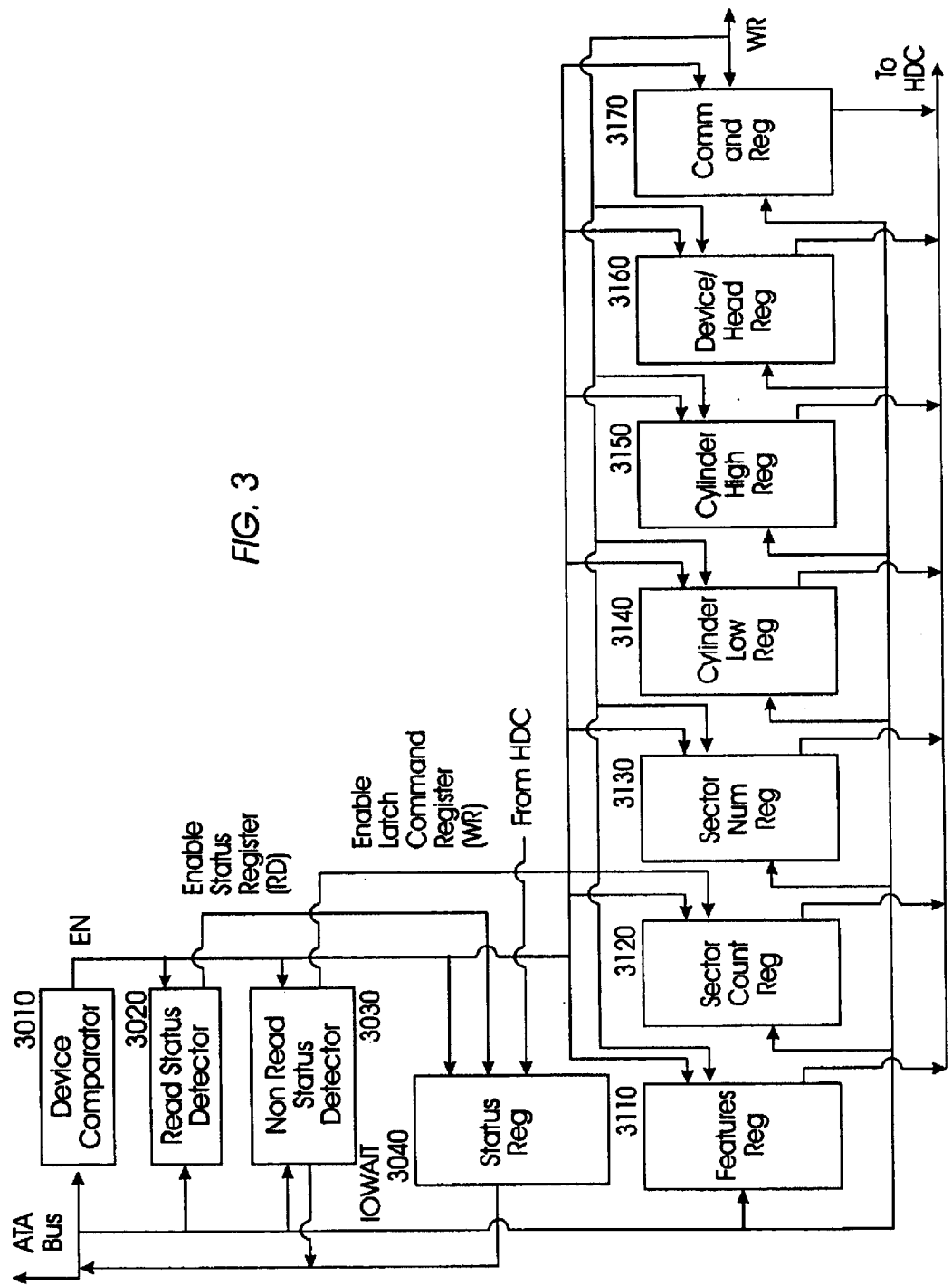

INTELLIGENT ELECTRONIC POWER CONTROLLER

BACKGROUND OF THE INVENTION

1. Field of the Invention

The present invention relates to the field of disk drives and peripheral components for a computer system. More particularly, the present invention relates to a system and method for controlling power of a disk drive or of a peripheral component for a computer system.

2. Description of the Related Art

Hard Disk Drives (HDDs) have multiple power modes that trade-off energy consumption for response time. Accordingly, a relatively short response time has an associated relatively higher energy consumption because a greater proportion of the HDD is powered up and active. Typical power modes for an HDD include Active, Idle, Standby and Sleep modes. Other mobile computer peripheral devices, such as a microprocessor ($\mu$P) and a liquid crystal display (LCD), provide power modes that are analogous to HDD power modes.

An HDD operating in the Sleep mode, which consumes the least amount of power of the different power modes, returns to the Active mode in response to a specific command received by the HDD. An HDD operating in either of the Idle and Standby modes returns to the Active mode in response to any command received by the HDD, so that the use of the low-power Idle and Standby modes are transparent to the host system. Such capability requires that the interface remain responsive and that state information is retained by the HDD during the Idle and Standby modes. These functions are achieved by keeping the interface control electronics of the HDD fully operational during both the Idle and Standby modes.

For example, when an HDD is operating in the Standby mode, bus commands are constantly monitored and interpreted. To do this, the hard disk controller (HDC), the microprocessor ($\mu$P), the random access memory (RAM) and the clocking (CLK) circuits of the HDD must each be operational. The corresponding power consumption is about 300 mW, and the recovery time from the Standby mode is about 1.5 seconds.

Low-power modes for HDDs are characterized by reducing or halting electronic functions and slowing or halting mechanical motion. For example, in the Standby mode for an HDD, the disk is not spinning, and much of the electronics are powered down. The interface electronics, however, remain powered, typically consuming 250 mW. Because the interface activity is minimal during a low-power mode, much of the power used for the interface is wasted.

What is needed is a way to control the interface power consumption of a device so that the device power consumption is substantially reduced from that in conventional low-power modes of the device.

SUMMARY OF THE INVENTION

The present invention provides a system and method for controlling the power consumption in a device so that the device power consumption is substantially reduced in comparison to conventional low-power modes of the device, and so that there is minimal impact on performance and no need for host intervention. In particular, power consumption may be substantially reduced from that of a device operating in a conventional Standby power mode.

The advantages of the present invention are provided by a device, such as an HDD, that includes operational logic and power control logic. The operational logic is responsive to communication signals over an interface from a host for performing I/O operations. The operational logic also provides a first and a second mode of operation, such that the second mode of operation consumes less power than the first mode of operation. In the first mode of operation, the device is coupled to the interface and is ready to respond to I/O communications. Preferably, the first mode of operation is an Active, Idle or Standby mode of operation. The second mode of operation is an enhanced low power mode. The power control logic is coupled to the communication signals from the interface and controls the operational logic when the operational logic is in the second mode of operation. The power control logic enables the operational logic to enter the first mode of operation when the power control logic detects a communication signal over the interface, such as a Write command, that requires the operational logic to be in the first mode of operation.

According to the invention, the power control logic includes monitor logic, a command register and a state value memory. The monitor logic is connected to an interface, such as an ATA bus. The monitor logic generates a control signal in response to the predetermined communication signal over the interface. The command register stores the predetermined communication signal in response to the control signal, and the state value memory stores state values for the first mode of operation of the operational logic when the operational logic is in the second mode of operation. The power control logic also includes a status register that stores status information of the operational logic when the operational logic is in the second mode of operation. When the monitor logic detects a status read communication signal, a read signal is generated. The status register then outputs the status information in response to the read signal.

BRIEF DESCRIPTION OF THE DRAWING

The present invention is illustrated by way of example and not limitation in the accompanying figures in which like reference numerals indicate similar elements and in which:

FIG. 3 shows a schematic block diagram for a preferred configuration of a hardware bus monitor circuit according to the present invention.

DETAILED DESCRIPTION

The present invention provides a system and a method for controlling power reduction in a device, such as an HDD, so that energy consumption is reduced in comparison to the power consumption of an HDD operating in any conventional power mode. Power consumption for an HDD incorporating the power-control system of the present invention during an "enhanced" Standby power mode is about 50 mW. The recovery time from the enhanced Standby mode to the conventional Standby mode is significantly less than the recovery time from the conventional Standby mode to the Active mode, thus the enhanced Standby mode of operation of the present invention is transparent to the system.

To achieve such advantages, the present invention provides a power-control system that turns off dynamic-type circuits of the HDD, such as the HDC, µP and CLK circuits. As used herein, "dynamic-type" circuitry is electronic circuitry that can be powered down to provide a reduced power consumption mode. According to the invention, the power-control system of the present invention is a static-type circuit that monitors bus activity generated by a host computer system. "Static-type" circuitry, as used herein, is electronic circuitry that remains powered during a reduced power consumption mode. Upon detection of a Write command intended for the HDD, the power-control system of the present invention powers up the dynamic-type circuitry of the HDD.

Figure 1:
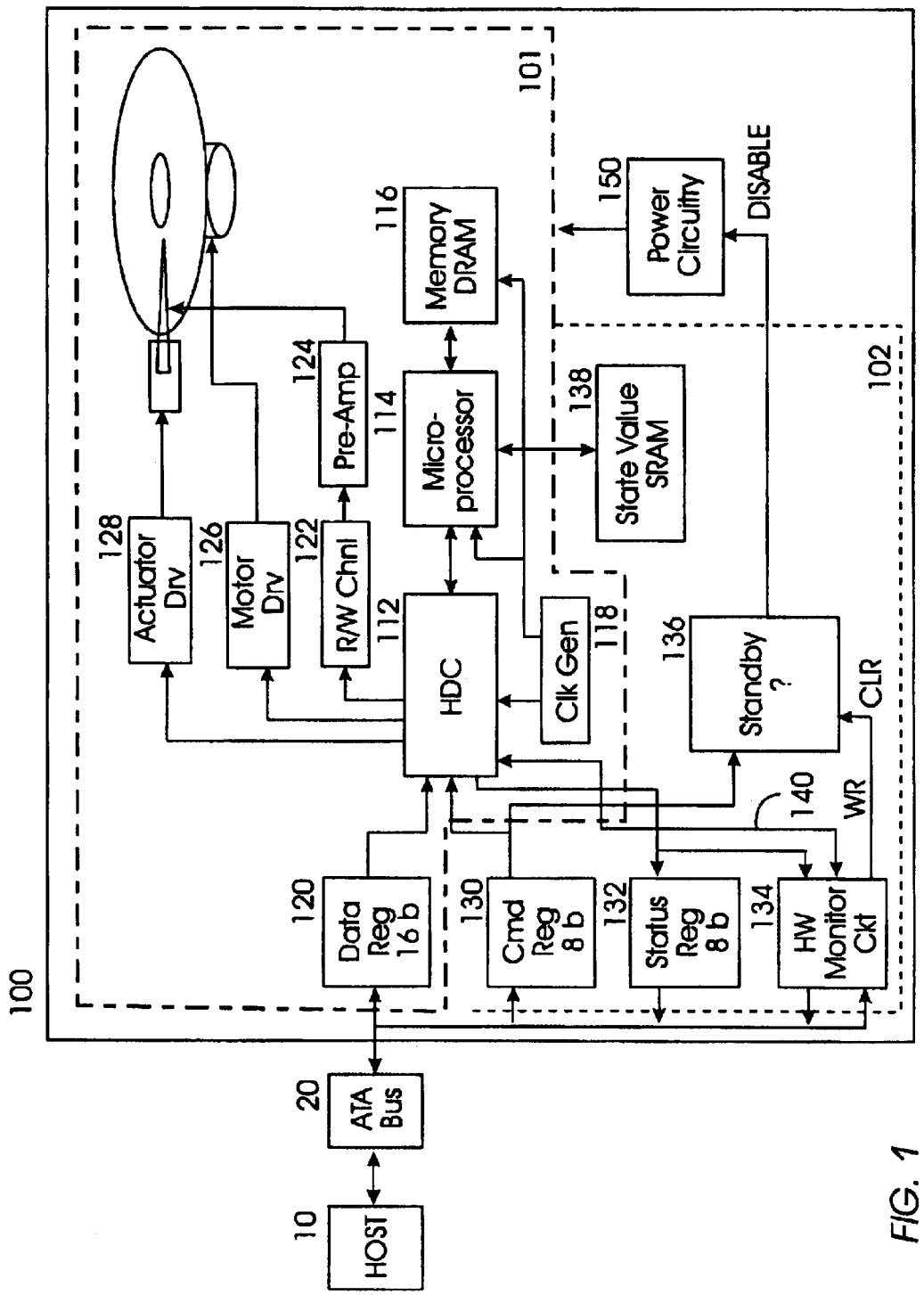
FIG. 1 shows a schematic block diagram of a disk drive having power-control system according to the present invention.

FIG. 1 shows a schematic block diagram of a disk drive 100 having a power-control system according to the present invention. Disk drive 100 includes electronic circuitry 101. Electronic circuitry 101 includes the dynamic-type circuitry of disk driver 100, such as an HDC 112, a microprocessor 114, a memory 116, a clock generating circuit 118, a 16-bit data register 120, a Read/Write (R/W) channel circuit 122, a pre-amplifier 124, a motor drive 126, an actuator drive 128 and power circuitry 150. Disk drive 100 is connected to a host computer 10 through an ATA bus 20.

Electronic circuitry 101 operates in a well-known manner to provide features and functions associated with conventional HDDs. Commands, status information and data are communicated between host computer 10 and disk drive 100 over ATA bus 20 in a well-known manner. Additionally, power circuitry 150 operates in a well-known manner to supply power to specific portions of disk drive 100 in a well-known manner, thereby providing various power modes of operation.

Disk drive 100 also includes a power-control system 102 for providing an enhanced Standby mode according to the present invention. Power-control system 102 includes static-type circuitry, such as an 8-bit Command register 130, an 8-bit Status register 132, a Hardware Bus Monitor circuit 134, a Standby latch 136 and a State Value register 138.

Each of Command register 130, Status register 132 and Hardware Bus Monitor circuit 134 is connected to ATA bus 20. Hardware Bus Monitor Circuit 134 generates a WR output that is connected to Standby latch 136. Additionally, Hardware Bus Monitor circuit 134 includes a bus connection 140 to HDC 112. Standby latch 136 has a disable output that is connected to power circuitry 150.

FIG. 3 shows a schematic block diagram of a preferred embodiment for Hardware Bus Monitor circuit 134 for monitoring ATA bus interface 20. FIG. 3 shows that Hardware Bus Monitor circuit 134 includes a Device Comparator circuit 3010, a Read Status Detector circuit 3020, a Non Read Status Detector circuit 3030, a Status register 3040 (Status Register 132 in FIG. 1) and a plurality of registers 3110–3170.

When disk drive 100 enters into the enhanced Standby mode, Hardware Bus Monitor circuit 134 begins to monitor bus activities on ATA bus 20. The entry of enhanced Standby can be initiated either by disk drive 100 or by a command over interface 20. For an ATA bus, there are typically two devices connected to the ATA bus, Device 0 and Device 1. (Device 0 is also referred as a Master drive, and Device 1 is referred as a Slave drive.) When host 10 desires to communicate with either drive (Device 0 or Device 1), host 10 first sends a command to Device/Head register 3160 for selecting the desired device. The fourth bit of Device/Head register 3160 is the Device bit, so when the fourth bit is 0, host 10 intends to interact with device 0 (Master). Similarly, when the fourth bit is 1, host 10 intends to interact with device 1 (Slave).

Device Comparator circuit 3010 determines whether host computer 10 is communicating with disk drive 100. When Device Comparator circuit 3010 detects that host 10 is communicating with disk drive 100, Device Comparator circuit 3010 issues an enable signal EN, thereby allowing hardware monitor circuits 3020–3100 to interact with host 10. Read Status Detector circuit 3020 determines the current host command type. When the command type is a read status command, Read Status Detector circuit 3020 sets an Enable Status register (RD) signal. In response, the contents of the Status register 3040 (Status Register 132) are sent back to host 10. (There are two Read Status commands. The first is an Alternate Status Register command. The second is Status Register command. The contents of both registers are the same.)

Non Read Status Detector circuit 3030 detects when a command from host 10 is not a Read Status command, in which case Non Read Status Detector circuit 3030 sets an Enable Latch Command Registers signal (WR). All incoming commands from host 10 are stored in temporary registers 3100–3170, which store all possible host command block registers directed to HDD 100. For example, Features register 3110 stores a host feature command block register. Sector Count register 3120 stores a host sector number command block register. Cylinder Low register 3140 stores a host cylinder low command block register. Cylinder High register 3150 stores a host cylinder high command block register. Device/Head register 3160 stores the host device/head command block register. Command register 3170 stores a host command block.

Table 1 shows I/O functions and selected addresses except PACKET and SERVICE commands based on the ATA/ATAPI-4 Specification, p. 318. In Table 1, an "A" indicates a signal asserted, an "N" indicates a signal negated, and an "X" indicates a "do not care".

TABLE 1

| Addresses | | | | | Functions | |
|---|---|---|---|---|---|---|
| CS0- | CS1- | DA2 | DA1 | DA0 | Read (DIOR-) | Write (DIOW-) |
| N | N | X | X | X | Data bus high impedance | Not used |
| | | | | | Control Block Registers | |
| N | A | N | X | X | Data bus high impedance | Not used |
| N | A | A | N | X | Data bus high impedance | Not used |
| N | A | A | A | N | Alternate Status | Device Control |
| N | A | A | A | A | Obsolete | Not used |
| | | | | | Command Block Registers | |
| A | N | N | N | N | Data | Data |
| A | N | N | N | A | Error | Features |
| A | N | N | A | N | Sector Count | Sector Count |
| A | N | N | A | A | Sector Number | Sector Number |
| A | N | A | N | N | Cylinder Low | Cylinder Low |
| A | N | A | N | A | Cylinder High | Cylinder High |
| A | N | A | A | N | Device/Head | Device/Head |
| A | N | A | A | A | Status | Command |
| A | A | X | X | X | Invalid Address | Invalid Address |

Table 2A shows ATA command block register data that the host shall supply from ATA/ATAPI-4 Specification, Section 8, Command descriptions, p. 49. Table 2B shows ATA command block register data that is returned by the device at the end of a host command.

TABLE 2A

| Register | 7 | 6 | 5 | 4 | 3 | 2 | 1 | 0 |
|---|---|---|---|---|---|---|---|---|
| Features | b7 | b6 | b5 | b4 | b3 | b2 | b1 | b0 |
| Sector Count | b7 | b6 | b5 | b4 | b3 | b2 | b1 | b0 |
| Sector Number | b7 | b6 | b5 | b4 | b3 | b2 | b1 | b0 |
| Cylinder Low | b7 | b6 | b5 | b4 | b3 | b2 | b1 | b0 |
| Cylinder High | b7 | b6 | b5 | b4 | b3 | b2 | b1 | b0 |
| Device/Head | b7 | b6 | b5 | b4 | b3 | b2 | b1 | b0 |
| Command | | | | Command Code | | | | |

TABLE 2B

| Register | 7 | 6 | 5 | 4 | 3 | 2 | 1 | 0 |
|---|---|---|---|---|---|---|---|---|
| Error | b7 | b6 | b5 | b4 | b3 | b2 | b1 | b0 |
| Sector Count | b7 | b6 | b5 | b4 | b3 | b2 | b1 | b0 |
| Sector Number | b7 | b6 | b5 | b4 | b3 | b2 | b1 | b0 |
| Cylinder Low | b7 | b6 | b5 | b4 | b3 | b2 | b1 | b0 |
| Cylinder High | b7 | b6 | b5 | b4 | b3 | b2 | b1 | b0 |
| Device/Head | b7 | b6 | b5 | b4 | b3 | b2 | b1 | b0 |
| Status | b7 | b6 | b5 | b4 | b3 | b2 | b1 | b0 |

Each register indicated in Tables 2A and 2B is an eight bit word. The Feature register is used for indicating whether the command is mandatory or optional. The Cylinder Low, Cylinder High, Device/Head and Sector Number registers specify the starting data sector address for either read or write operation, and Sector Count register specifies the number of sectors. The Command register is the specific command code. For a normal operation, Error register is normally "na". The Status register contains the following information:

Bit 7, BSY, shall be cleared to zero when the command is complete,

Bit 6, DRDY, shall be set to one,

Bit 5, DF, shall be cleared to zero,

Bit 3, DRQ, shall be cleared to zero, and

Bit 0, ERR, shall be cleared to zero.

Status register 3040 (Status Register 134) contains the status of HDC 112 before HDD 100 entered the Standby mode. During the Standby mode, whenever host 10 is intends to obtain the status of HDD 100,the contents of Status Register 3040 are returned to host 10 in response to a status query.

When the WR signal is set, Standby latch 136 is cleared so that the Disable signal output from Standby latch 136 is not true. At the same time an IOWAIT signal is issued by Hardware Monitor circuit 134 to inform host 10 not to send any additional commands and to allow HDD to return to the Active mode. In response, power circuitry 150 restores the power to the dynamic-type circuits, thereby waking up HDD 100. Once HDD 100 is fully functional in the normal operation state, the contents of registers 3110–3170 are transferred to HDC 112, and HDC 112 processes the new commands. The IOWAIT signal is removed, and a normal HDD operation is resumed.

There are many possible host interface buses that can be used for connecting HDD 100 to host 10.For example, the two most widely used interface buses are the ATA bus interface and the SCSI bus interface, both of which are parallel interface buses. Less used interface buses include the SSA bus interface, the FC-AL bus interface, USB, and the P-1394 or I-Link bus interface, each of which are serial interface buses. The present invention is applicable to all HDDs, regardless of the type of interface bus used. Of course, the actual configuration of Hardware Bus Monitor circuit 134 will vary depending on the particular interface bus used for connecting HDD 100 to host 10, but the basic function provided by Hardware Bus Monitor circuit 134 remains the same. Specifically, when HDD 100 is in the enhanced Standby mode, Hardware Bus Monitor circuit 134 must determine the command type of any incoming host commands for appropriately waking up HDD 100. It is also beneficial to have the monitor circuit return status for simple status read commands without waking up the HDD.

For a SCSI interface bus, there are potentially eight devices on a single bus, consequently, Hardware Bus Monitor circuit 134 must be able to correctly detect the particular device being addressed. For a dual port bus type interface, such as the FC-AL bus interface, the electronics circuits used for routing bus interface signals between the input and output ports are kept active while the HDD is in the enhanced Standby mode. Accordingly, Hardware Bus Monitor circuit 134 must determine whether the host has addressed the HDD. Otherwise, the bus interface signals must continue to be routed in a well-known manner.

Figure 2:
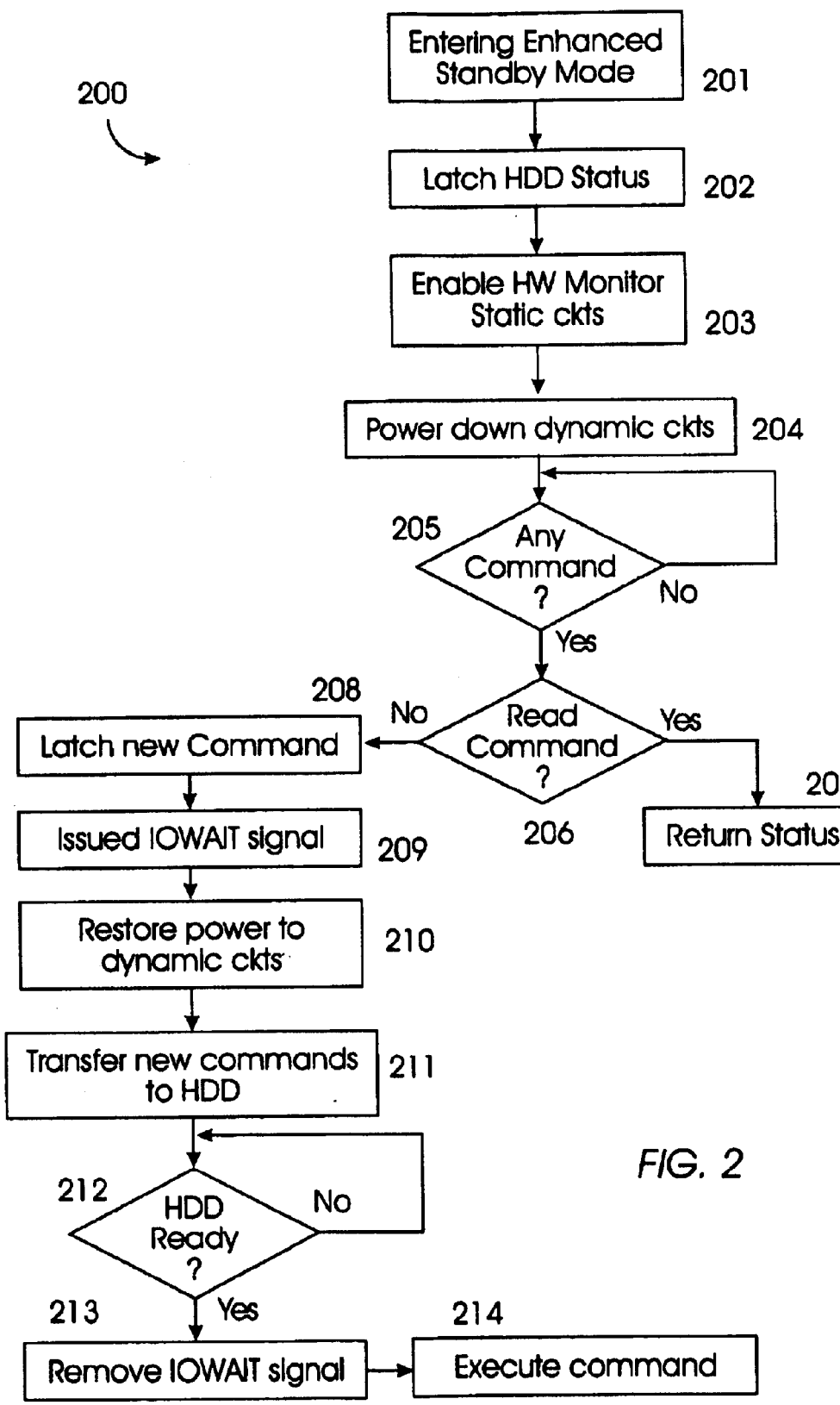
FIG. 2 shows a flow diagram of an enhanced Standby power mode control process according to the present invention.

FIG. 2 shows a flow diagram of an enhanced Standby power mode control process 200 according to the present invention. At step 201, disk drive 100 enters the enhanced Standby power mode in response to a host ATA bus command (e.g., a Standby Immediate command) or in response to internal operating conditions of disk drive 100. When the enhanced Standby mode is successfully entered, flows continues to step 202 where the status of disk drive 100 is stored in the Status register 3040 within Hardware Bus Monitor circuit 134. At step 203, dynamic-type electronics circuits of disk drive 100 are powered down. At step 204, Hardware Bus Monitor circuit 134 is enabled, and becomes ready to monitor the host interface bus activities. All of the important state values are also stored in state value register 138 at step 204. After all static-type hardware circuitry of the present invention has been enabled, Standby latch 136 is set.

While disk drive 100 is in the enhanced Standby mode of operation at step 205, Hardware Bus Monitor circuit 134 monitors host interface activities on ATA bus. If Hardware Bus Monitor circuit 134 detects a new command from host 10, flow continues to step 206 where it is determined whether a Read Status command was issued by host 10. If, at step 206, it is determined that a Read Status command was issued by host 10, then the Read Status Detector circuit 3020 within Hardware Bus Monitor circuit 134 issues the RD signal for enabling the contents of Status register 3040 to be returned to host 10 at step 207. If, at step 206, it is determined that a command other than a Read Status command was issued by host 10, such as a write command, then Non Read Status Detector circuit 3030 generates the WR signal. Flow continues to step 208, where, in response to the WR signal, all the command register values are latched into registers 3110–3170. Flow continues to step 209, where the Hardware Monitor circuit 134 issues an IOWAIT signal to hold off any new interface command.

At step 210, power is restored to the dynamic-type circuits of disk drive 100 in response to a cleared Standby latch 136, disk drive 100 enters the Active mode of operation, and the contents of State Value register 138 is loaded into microprocessor 114. At step 211, the impending host command sequence is transferred to the HDC 112. At step 212, when it is determined that disk drive 100 is ready to execute the new command, flow continues to step 213, the IOWAIT signal is removed, flow continues to step 214 where the new command is executed.

Power control system 102 of the present invention can also be used when HDD 100 is in an Idle power mode because the dynamic-type interface electronics do not need to be powered to keep the disk spinning. Thus, the power control system of the present invention can be incorporated into an HDD that is used in a lap-top computer, as well in an HDD that is used in a desktop or a server computer system.

Further, the invention is applicable to non-HDD device that connect to an interface and have multiple power modes. For example, CD-ROM type devices, tape drives, and communication devices, such as modems and network interfaces, may all use the invention. In the case of all these device, the invention provides for the restoration of function from a low interface power mode without the need for a special "wake-up" command.

While the power control logic has been described in detail as electronic circuits, it will be clear that these functions may be performed by software as well. Moreover, the present invention has been described in connection with the illustrated embodiments, it will be appreciated and understood that modifications may be made without departing from the true spirit and scope of the invention.

What is claimed is:

1. A device, comprising:

operational logic response to communication signals over an interface for performing input/output operations, the operational logic providing a first and second mode of operation, the second mode of operation consuming less power than the first mode of operation; and power control logic controlling the operational logic when the operational logic is in the second mode of operation, the power control logic being coupled to the communication signals over the interface and enabling the operational logic to enter the first mode of operation when the power control logic detects a communication signal over the interface that requires the operational logic to be in the first mode of operation, the power control logic including a state value memory storing state values for the second mode of operation of the operational logic when the operational logic is in the first mode of operation.

2. The device according to claim 1, wherein the device is a disk drive.

3. The device according to claim 2, wherein the disk drive is connected to a host computer over the interface.

4. The device according to claim 1, wherein at least one of the operational logic and power control logic is an electronic circuit.

5. The device according to claim 1, wherein the power control logic includes, monitor logic generating a control signal in response to the communication signal over the interface that requires the operating logic to be in the first mode of operation; and a command register storing the communication signal in response to the control signal.

6. The device according to claim 5, wherein the communication signal is a write command.

7. The device according to claim 5, wherein the power control logic further includes a status register storing status information of the operational logic when the operational logic is in the first mode of operation, the monitor logic generating a read signal in response to a status read communication signal over the interface, and the status register outputting the status information in response to the read signal.

8. The device according to claim 1, wherein the power control logic is coupled to a bus circuit connected between the operational logic and a host computer.

9. The device according to claim 8, wherein the bus circuit is one of an ATA bus, a SCSI bus, an FC-AL bus, an SSA bus, a P-1394 bus, and a USB bus.

10. The device according to claim 1, wherein the first mode of operation is a standby mode of operation.

11. The device according to claim 1, wherein the first mode of operation is an idle mode of operation.

12. A method for controlling power of a device, the device having operational logic, the method comprising:

detecting a communication signal over an interface intended for the operational logic of the device, the operational logic having a first mode of operation and a second mode of operation, the operational logic consuming more power in the first mode of operation than in the second mode of operation, the communications signal being detected when the operational logic is in the second mode of operation and requiring that the operational logic be in a first mode of operation;

storing state values for the first mode of operation of the operational logic when the operational logic is in the second mode of operation;

storing the communication signal when the communication signal is detected; and enabling the operational logic to enter the first power mode of operation.

13. The method according to claim 12, wherein the device is a disk drive.

14. The method according to claim 13, wherein the disk drive is connected to a host computer over an interface.

15. The method according to claim 12, wherein the operational logic is an electronic circuit.

16. The method according to claim 12, wherein the operational logic is an electronic circuit.

17. The method according to claim 12, further comprising:

storing status information of the operational logic when the operational logic is in the second mode of operation;

generating a read signal in response to a status read communication signal over the interface; and outputting the status information in response to the read signal.

18. The method according to claim 12, when the communication signal is transmitted over a bus circuit connected between the operational logic and a host computer.

19. The method according to claim 18, wherein the bus circuit is one of an ATA bus, an SCSI bus, a FC-AL bus, an SSA bus, a P-1394 bus, and a USB bus.

20. The method according to claim 12, wherein the first mode of operation is a standby mode of operation.

21. The method according to claim 12, wherein the first mode of operation is an idle mode of operation.

22. A device, comprising:

operational logic response to communication signals over an interface for performing input/output operations, the operational logic providing a first and second mode of operation, the second mode of operation consuming less power than the first mode of operation; and power control logic controlling the operational logic when the operational logic is in the second mode of operation, the power control logic being coupled to the communication signals over the interface and enabling the operational logic to enter the first mode of operation when the power control logic detects a communication signal over the interface that requires the operational logic to be in the first mode of operation, the power control logic including:

a status register storing status information of the operational logic when the operational logic is in the first mode of operation, and monitor logic generating a control signal in response to the communication signal over the interface that requires the operating logic to be in the first mode of operation, the monitor logic further generating a read signal in response to a status read communication signal over the interface, and the status register outputting the status information in response to the read signal.

23. The device according to claim 22, wherein the device is a disk drive.

24. The device according to claim 23, wherein the disk drive is connected to a host computer over the interface.

25. The device according to claim 22, wherein at least one of the operational logic and power control logic is an electronic circuit.

26. The device according to claim 22, wherein the power control logic includes a command register storing the communication signal in response to the control signal.

27. The device according to claim 26, wherein the communication signal is a write command.

28. The device according to claim 22, wherein the power control logic including a state value memory storing state values for the second mode of operation of the operational logic when the operational logic is in the first mode of operation.

29. The device according to claim 22, wherein the power control logic is coupled to a bus circuit connected between the operational logic and a host computer.

30. The device according to claim 29, wherein the bus circuit is one of an ATA bus, a SCSI bus, an FC-AL bus, an SSA bus, a P-1394 bus, and a USB bus.

31. The device according to claim 22, wherein the first mode of operation is a standby mode of operation.

32. The device according to claim 22, wherein the first mode of operation is an idle mode of operation.

33. A method for controlling power of a device, the device having operational logic, the method comprising:

detecting a communication signal over an interface intended for the operational logic of the device, the operational logic having a first mode of operation and a second mode of operation, the operational logic consuming more power in the first mode of operation than in the second mode of operation, the communications signal being detected when the operational logic is in the second mode of operation and requiring that the operational logic be in a first mode of operation;

storing status information of the operational logic when the operational logic is in the second mode of operation;

generating a read signal in response to a status read communication signal over the interface;

outputting the status information in response to the read signal;

storing the communication signal when the communication signal is detected; and enabling the operational logic to enter the first power mode of operation.

34. The method according to claim 33, wherein the device is a disk drive.

35. The method according to claim 34, wherein the disk drive is connected to a host computer over an interface.

36. The method according to claim 33, wherein the operational logic is an electronic circuit.

37. The method according to claim 33, wherein the operational logic is an electronic circuit.

38. The method according to claim 33, further comprising storing state values for the first mode of operation of the operational logic when the operational logic is in the second mode of operation.

39. The method according to claim 33, when the communication signal is transmitted over a bus circuit connected between the operational logic and a host computer.

40. The method according to claim 39, wherein the bus circuit is one of an ATA bus, an SCSI bus, an FC-AL bus, an SSA bus, a P-1394 bus, and a USB bus.

41. The method according to claim 33, wherein the first mode of operation is a standby mode of operation.

42. The method according to claim 33, wherein the first mode of operation is an idle mode of operation.

* * * * *